(12) United States Patent
Craver (10) Patent No.: US 9,782,013 B2
(45) Date of Patent: *Oct. 10, 2017

(54) READY-TO-ASSEMBLE BED FOUNDATION

(71) Applicant: Larry James Craver, Winston-Salem, NC (US)

(72) Inventor: Larry James Craver, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,852

(22) Filed: Nov. 29, 2016

(65) Prior Publication Data

US 2017/0079443 A1    Mar. 23, 2017

Related U.S. Application Data

(63) Continuation of application No. 11/501,217, filed on Aug. 8, 2006, now Pat. No. 9,538,851.

(51) Int. Cl.
| | |
|---|---|
| *A47C 19/00* | (2006.01) |
| *A47C 19/02* | (2006.01) |
| *G06Q 30/06* | (2012.01) |
| *A47B 91/06* | (2006.01) |
| *B65D 85/00* | (2006.01) |
| *F16B 12/56* | (2006.01) |

(52) U.S. Cl.
CPC ............ *A47C 19/005* (2013.01); *A47B 91/06* (2013.01); *A47C 19/025* (2013.01); *B65D 85/70* (2013.01); *F16B 12/56* (2013.01); *G06Q 30/0601* (2013.01); *G06Q 30/0633* (2013.01); *G06Q 30/0635* (2013.01); *G06Q 30/0641* (2013.01)

(58) Field of Classification Search
CPC ............................ A47C 19/025; A47C 19/005
See application file for complete search history.

(56) References Cited

U.S. PATENT DOCUMENTS

| | | | | |
|---|---|---|---|---|
| 4,181,991 | A * | 1/1980 | Morgan ................. | A47C 23/00 5/186.1 |
| 5,012,538 | A * | 5/1991 | Timm .................. | A47C 19/005 5/200.1 |
| 5,709,500 | A * | 1/1998 | Mizelle ..................... | A47C 4/02 16/386 |
| 5,820,214 | A * | 10/1998 | Bessette ............... | B60N 2/7005 297/228.13 |
| 6,058,535 | A * | 5/2000 | Firkins, Jr. ............. | A47C 7/021 297/219.1 |
| 9,538,851 | B2 * | 1/2017 | Craver ................. | A47C 19/005 |
| 2004/0078896 | A1 * | 4/2004 | Hellyer ................ | A47C 19/005 5/400 |
| 2007/0151026 | A1 * | 7/2007 | Felix ..................... | A47C 19/005 5/201 |

* cited by examiner

*Primary Examiner* — Eric J Kurilla
(74) *Attorney, Agent, or Firm* — Robert W. Pitts (57) ABSTRACT

A ready-to-assemble bed foundation in kit form including a pair of exterior beams connectable to a pair of transverse end members having openings, and an interior beam between the exterior beams having opposing end portions configured to engage the openings in the transverse end members. A method of selling a bed, and a method of assembling a bed are also disclosed.

19 Claims, 7 Drawing Sheets

FIG. 13 a top perspective view of an embodiment of a
READY-TO-ASSEMBLE BED FOUNDATION

CROSS REFERENCE TO PRIOR CO-PENDING APPLICATION

This application is a continuation of pending application Ser. No. 11/501,217.

BACKGROUND

The disclosure is directed to a ready-to-assemble bed foundation. More specifically, the bed foundation includes a pair of exterior side beams connectable to a pair of transverse end members having openings. The foundation also includes an interior beam between the side beams having opposing end portions configured to engage the openings in the transverse end members.

Ready-to-assemble bed foundations are known. Many are expensive and difficult to assemble, while others are of the type having a solid panel immediately below a mattress or box spring. These panels are often bulky or otherwise not suited to cost-effective shipping and storage. Other prior art foundations prevent access to the area below the mattress for storage, or do not provide for the addition of a slipcover. Thus, the prior art has not adequately addressed the need for a ready-to-assembly bed foundation that is economical to manufacture and easy to assemble, provides a comfortable yet stable support, permits access to a storage area under the bed, and provides for the addition of a slipcover.

SUMMARY OF THE DISCLOSURE

The disclosure is directed to a ready-to-assemble bed foundation having a pair of exterior side beams connectable to a pair of transverse end members having openings. The foundation also includes an interior beam having opposing end portions configured to engage the openings.

In this embodiment, the transverse end members, side beams, and interior beam of the foundation may include a pair of opposing longitudinal members coupled in spaced apart relation to a plurality of blocks. In addition, two of the blocks of the end members may be disposed in opposed relation to define an opening slightly larger than the opposing end portions of the interior beam.

The disclosure is further directed to an embodiment of a ready-to-assemble bed foundation including a pair of transverse end members; a pair of exterior side supports extending longitudinally from one of the transverse end members to the other, an interior support between the exterior side supports, and a plurality of spaced apart slats. Each of the slats has a surface defining a portion of the upper surface of the foundation and each is supported at opposing ends by the exterior supports and by the interior support between the opposing ends. The foundation of this embodiment also includes fasteners for coupling the slats at opposite ends to the exterior supports and permitting selective removal of the slats from the supports. The fasteners include a central stem and a plurality of flexible flanges surrounding the stem.

In this embodiment, the exterior side supports may include a plurality of slots for receiving the slats. Each slot is at least partially defined by a pair of opposing walls that are transversely oriented in relation to the longitudinal extension of the exterior side supports and a surface between the opposing walls substantially coplanar with a surface of the interior support for supporting. The surface includes an opening for receiving the fasteners, such that the slats are coupled at opposing ends to the exterior supports.

Another embodiment of a ready-to-assemble bed foundation is disclosed including an upper surface at least partially defined by generally coplanar tops of interchangeable slats. The slats are positioned to provide openings in the top of the foundation. Each of the slats is supported at both ends by one of a series of beams including a interior beam in floating engagement at each opposing end with one of a pair of transverse foundation end members.

A method of selling beds is disclosed including in an embodiment, selling a collapsed mattress, selling a disassembled foundation, and permitting a customer to carry the collapsed mattress and disassembled foundation to a car for transport to a residence for assembly of the foundation and uncollapsing of the mattress.

A method of assembling a bed is also disclosed. In an embodiment the method includes assembling a foundation by placing each of a pair of opposing ends of an interior support into an opening in one of a pair of a transverse end members, connecting a pair of exterior side beams to the transverse end members, and placing a plurality of slats into slots formed in the exterior side beams. The method may also include placing a slipcover on the foundation, uncollapsing a mattress and placing the mattress on the foundation.

These and other embodiments of the foundation will become apparent to those skilled in the art after a reading of the following description of the preferred embodiment when considered with the drawings.

DESCRIPTION OF THE VARIOUS EMBODIMENTS

The illustrations and descriptions thereof are for the purpose of describing embodiments of a bed foundation, and are not intended to limit the invention to any particular embodiment shown or described. Those of ordinary skill will recognize that the foundation described by the appended claims is subject to numerous embodiments.

Figure 1:
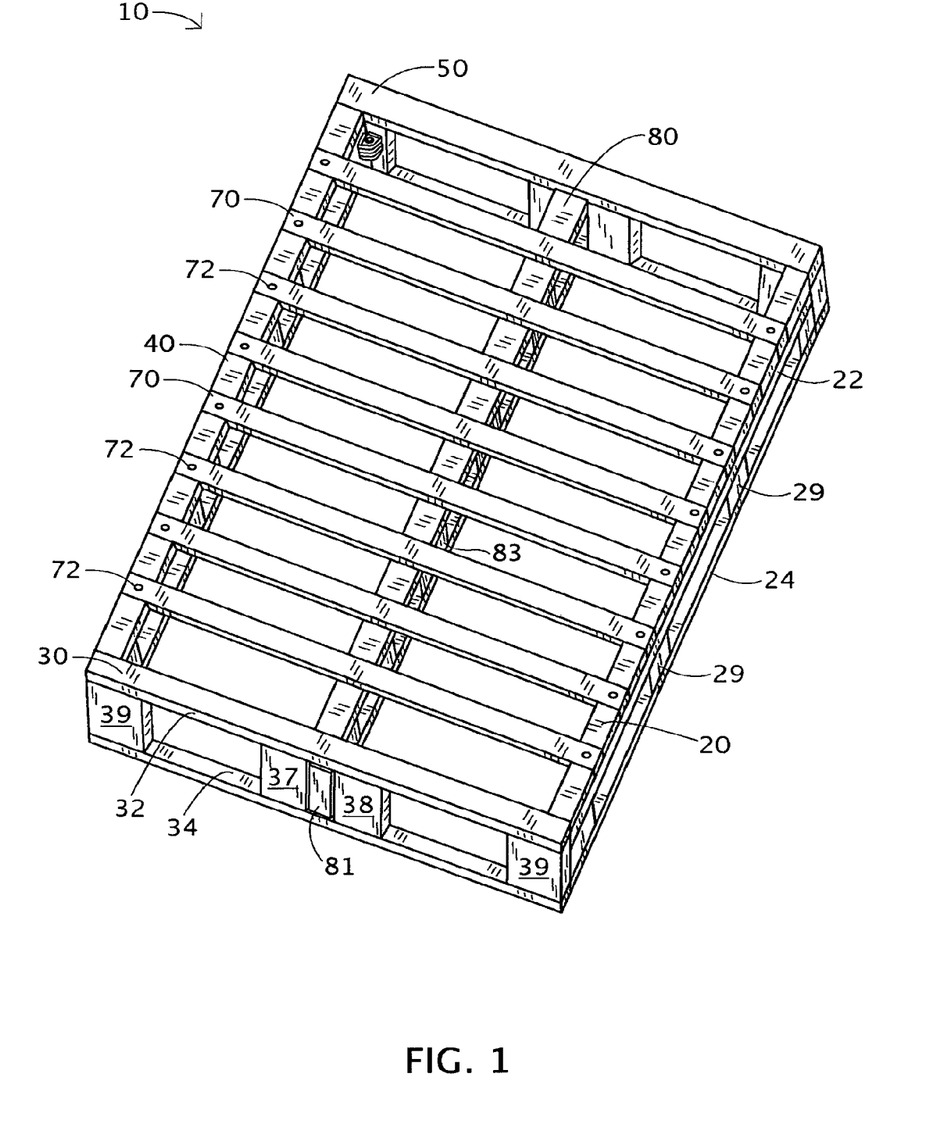
FIG. 1 is a top perspective view of an embodiment of a ready-to-assemble foundation for a bed, as already assembled from kit form.

FIG. 1 shows a foundation 10 for a platform bed. The foundation 10 includes a pair of exterior side beams 20 and 40 extending longitudinally between a pair of transverse end members 30 and 50 to form a generally rectangular outer frame. An interior support beam 80 may optionally be centrally located between the beams 20 and 40. Each of a plurality of flexible, spaced apart slats 70 extends longitudinally from one of the exterior side beams 20 or 40 to the interior beam 80 and has a top surface generally coplanar with the top surface of the frame.

The exterior side beam 20 is substantially identical to the beam 40 and includes an upper 22 and lower member 24 spaced vertically by a plurality of blocks 29 between the members 22 and 24. The upper member 22 includes a plurality of spaced apart slots for receiving the slats 70 to provide with ends of the slats 70 a generally planar top surface.

The transverse end member 30 is substantially identical to the member 50 and includes a pair of longitudinal members 32 and 34 spaced vertically by a plurality of blocks 37,38 and 39. The blocks 37 and 38 are spaced to provide an opening sized and positioned for easily receiving an end portion 81 of the interior beam 80. In the embodiment of the foundation 10 shown in FIG. 1, the opening between the blocks 37 and 38 is slightly larger than the end portion 81, which allows the end portion 81 to float within the opening. This allows the interior beam 80 to move slightly while being retained. Such movement provides "give" when an occupant of the bed moves.

Figure 2:
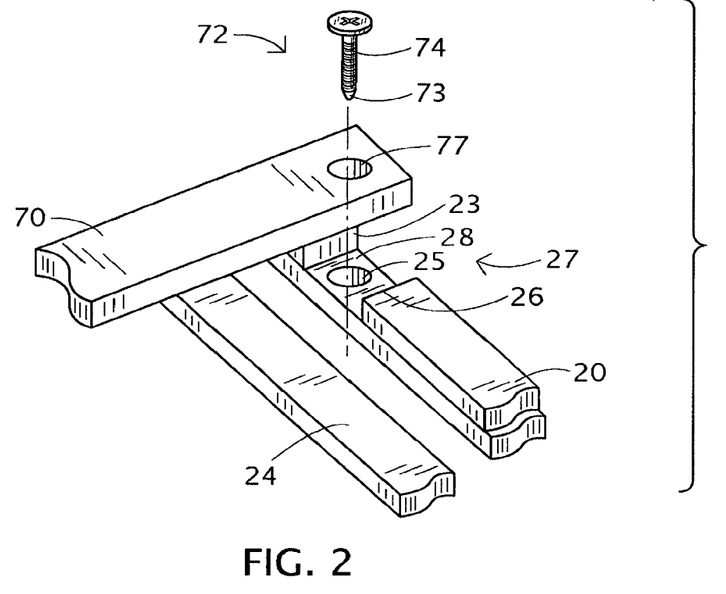
FIG. 2 is an enlarged top perspective view of fastening system for joining slats to the foundation.

FIG. 2 shows a fastener 72 for repeatedly coupling to and removing the slat 70 from the exterior side member 20, which includes slots such as the slot 27 defined by opposing walls 23 and 26 and a substantially horizontal surface 28 between the walls 23 and 26. The slat 70 includes an opening 77 and the surface 28 includes an opening 25 for receiving a fastener 72 stem 73 surrounded by a flexible flanges 74. The openings 77 and 25 are sized to provide engagement between the slat 70 and the beam 20 that remains intact during ordinary use of the foundation yet without the need for special tools permits removal of the slat 70 for storage or transportation of the foundation. Each slat 70 includes an opening at its opposite end like the opening 77 for receiving an additional fastener 72 and the beam 40 shown in FIG. 1 includes openings such as the opening 77.

Figure 3:
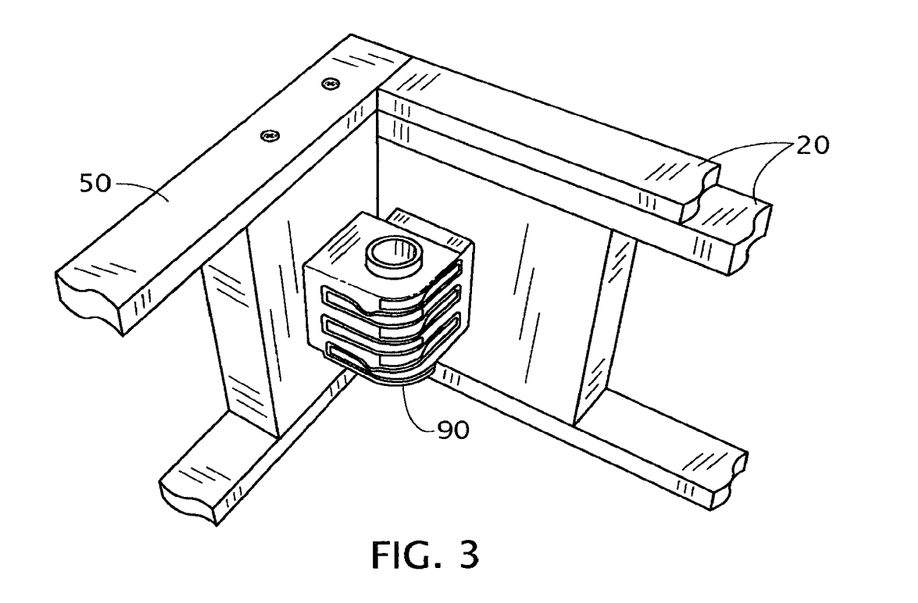
FIG. 3 is a top perspective view of the inside of a corner of an embodiment of the ready-to-assemble foundation.

FIG. 3 shows an inside corner of the foundation 10 including a connector 90, which is disclosed in U.S. Pat. No. 5,709,500, issued to Mizelle, incorporated herein in its entirety. The exterior beam 20 is coupled to the transverse end members 30 with the connector 90. This structure is replicated at the other corners of the outer frame of the foundation 10. In the Mizelle connector, the tapered pins join bases that have interleaved tongues with a conical bore in which the pins can fit. In another design not covered in the Mizelle patent, the taper of the connecting pin and the bores in the base units have been eliminated. The bores are all of the same diameter and the diameter of each bore is constant, rather than having a truncated conical shape. The pin has a substantially constant diameter along its length except for a series of outwardly protruding peripheral ridges or ribs. These outward protruding ribs frictionally engage the inside wall of the constant-cross section bores to hold the pins in place.

Figure 4:
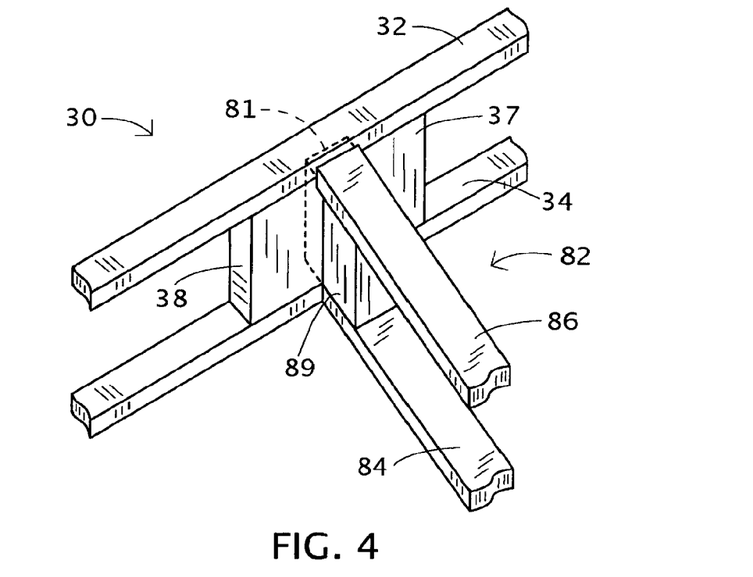
FIG. 4 is a top perspective view of a joint between an interior beam and a transverse end member of an embodiment of a ready-to-assemble foundation for a bed.

FIG. 4 is an end of the interior beam 80, which also includes an upper 82 and lower member 84 spaced vertically by a plurality of blocks such as the blocks 83 (shown in FIG. 1) and 89. The upper member 82 includes a generally horizontal planar surface 86 for supporting the slats 70 without the need for fastening the slats 70 to the surface 86. The beam 80 includes two opposing end portions, such as the end portion 81 shown, which is configured extend into the opening between the blocks 37 and 38 of the transverse end member 30 when the foundation is assembled.

Figure 5:
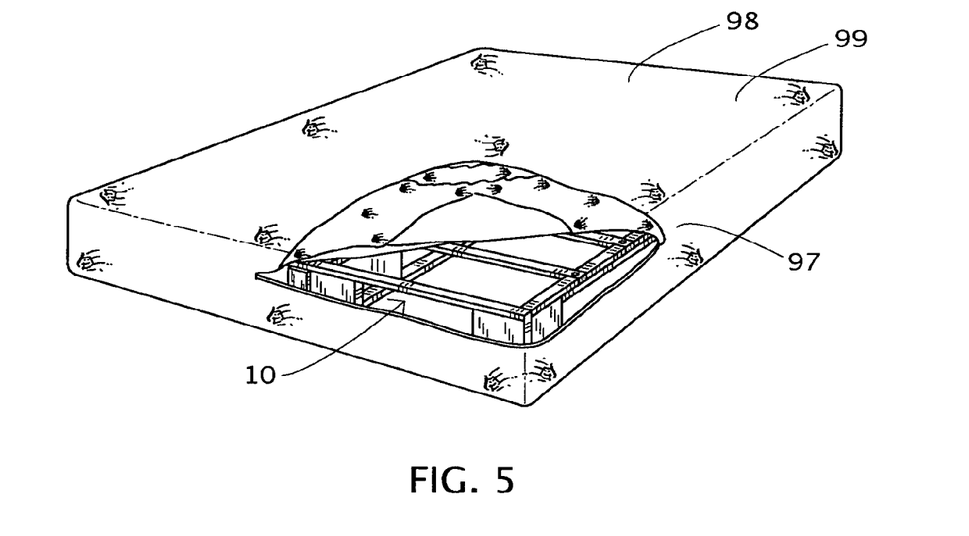
FIG. 5 is a top perspective view of a slipcover on the ready-to-assemble bed foundation.

FIG. 5 shows the foundation 10 with a slipcover 98 over the generally rectangular frame of the foundation 10. The slipcover 98 may optionally include an integrally formed padding 99 for placement above the foundation and a zipper seam 97 to facilitate installation of the foundation 10 in the slipcover 98.

Figure 6:
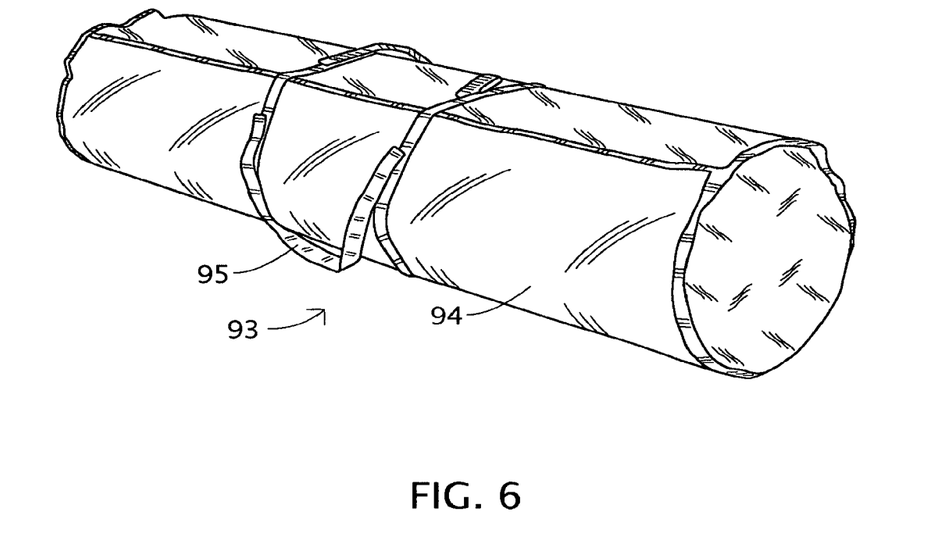
FIG. 6 is a top perspective view of a mattress suitable for use with embodiments of the foundation in a mattress container.

FIG. 6 shows a mattress 94—in a collapsed configuration. The mattress 94 shown is vacuum packed into a handy transparent shipping and carrying bag 93 including handles 95. The disassembled foundation 10 can likewise be packaged in a carton, with or without carrying handles, or bag such as the bag 93 shown. The bag 93 provides a convenient container for carrying the mattress 94 and/or bed foundation 10 from a store to a vehicle, and further for transport from the vehicle into a residence for assembly. Alternatively, the mattress 94 can be sold to a customer from a catalogue or internet site shipped in this configuration. Such collapsed mattresses are known and are available from Garme Colchones, Poligone Industrial Norte, c/Barranco, serial number 46469, Beniparrell Valencia Spain or Garme USA, Inc. 1914 Aleghany Street, Suite 101, High Point, N.C. 27263.

Figure 7:
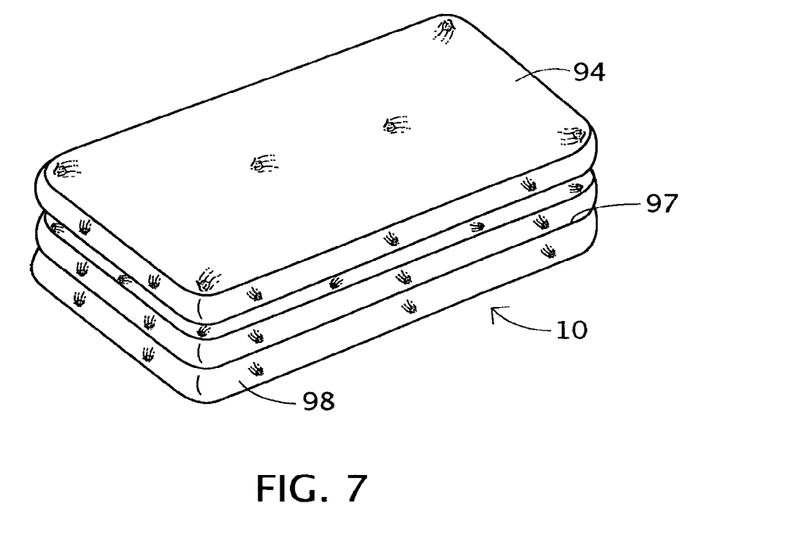
FIG. 7 is a top perspective view of an embodiment of a bed foundation having an optional slipcover and a mattress atop the foundation and slipcover.

FIG. 7 shows the mattress 94 in an uncollapsed configuration atop the foundation 10 and optional slipcover 98. A consumer can convert the mattress to the uncollapsed configuration shown after transport to a residence by simply removing the mattress 94 from the bag 93 shown in FIG. 5, unrolling it and allowing it to allow the mattress to expand.

The bed foundation can be provided in various sizes including but not limited to twin, double, queen, king and California king.

Figure 8:
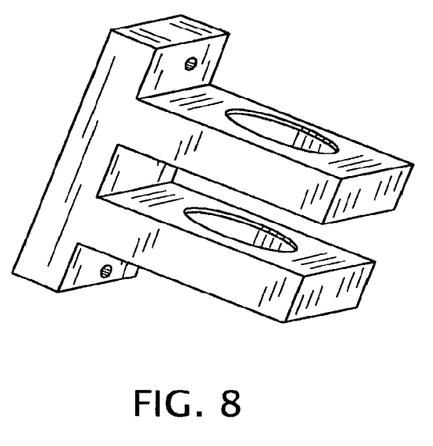
FIGS. 8 and 9 are views of alternate corner connectors, used together with a novel connecting pin shown in FIG. 10 (not to scale).
Figure 9:
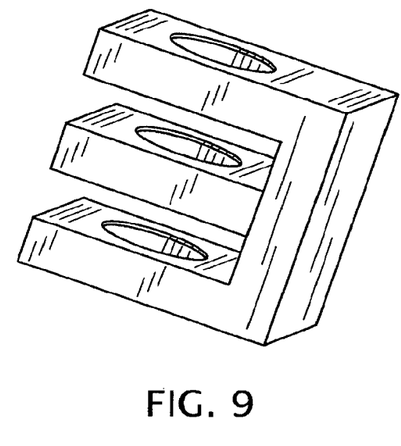
Figures 10, 11:
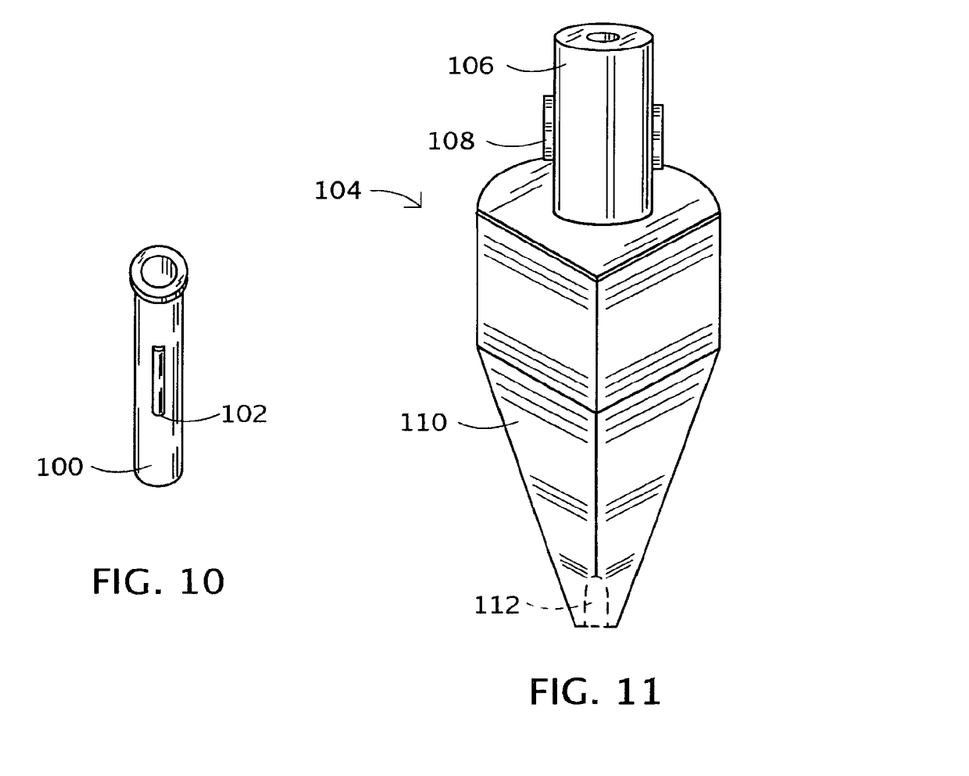
FIG. 11 is a perspective view of a combined foot and connecting pin.

The connectors of U.S. Pat. No. 5,709,500, discussed above have a series of holes that taper in diameter and the pin used with them has a taper, the tapers being used to lock the connector together. FIGS. 8 and 9 show an alternate connector design in which the taper of the holes is not needed. The holes formed can have equal sizes. FIG. 10 shows a pin 100 having a straight, uniform shaft and an axial ridge or protuberance 102 to engage the insides of the holes and frictionally engage the connector blocks.

FIG. 11 shows a combined pin and bed foot 104, enabling the use of the foundation without a bed frame. The combined pin and foot 104 includes a pin 106 having a straight, uniform shaft and an axial ridge or protuberance 108 to engage the insides of the holes and frictionally engage the connector blocks. This design works well with the connectors of FIGS. 8 and 9. The foot portion 110 extends down below the connector toward the floor. It can make contact with the floor, or more preferably, a glide or caster (not shown) is inserted in a hole 112 at the bottom of the foot 110. Thus, the side beams and transverse end members have connectors adjacent ends thereof, the connectors including flanges that can be interleaved with aligned openings through the interleaved flanges, and pins extend through the aligned openings having lower extensions forming feet for the foundation to rest on a floor. A combined foot and pin to be used with the connectors of U.S. Pat. No. 5,709,500 can also be considered, but would need to have the connectors installed upside down and then have the pin configured so its diameter diminishes from the lower to the upper part of the pin with the foot attached to the bottom of the pin. Such a design is within the scope of this invention, although not preferred.

Figure 12:
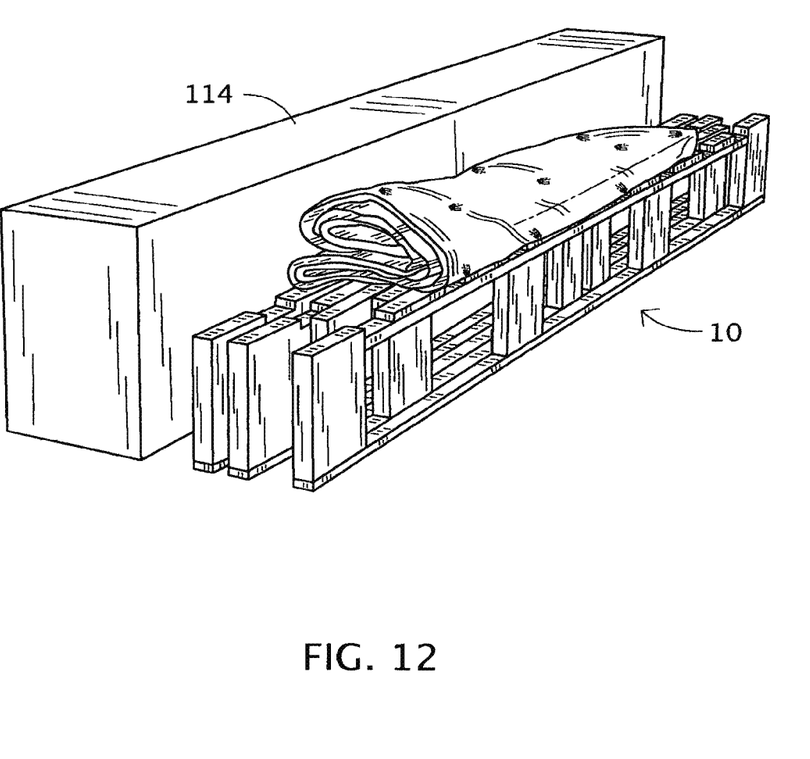
FIG. 12 is a perspective view of the ready to assemble foundation with slip cover adjacent a shipping carton sized and configured to receive the ready to assemble foundation with slip cover.

FIG. 12 shows the foundation unassembled, with the slipcover 98 folded on top. As can be seen, these collapsed subcomponents can fit into a carton 114 for easy shipping and storage.

Figure 13:
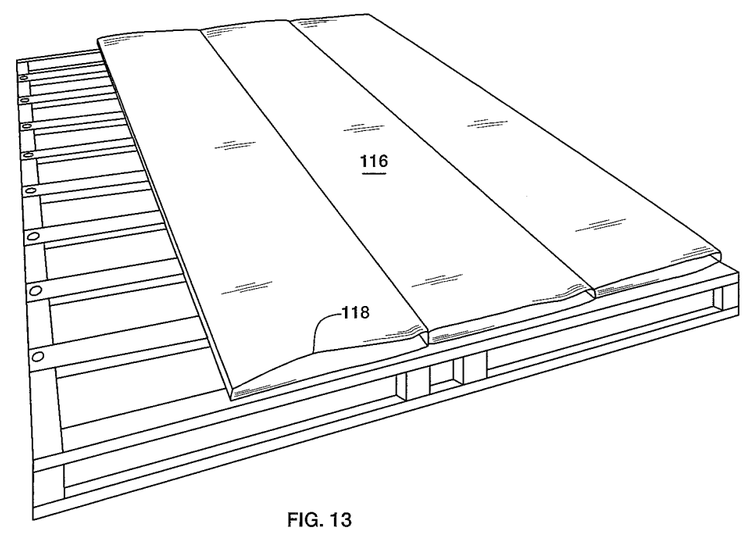
FIG. 13 is a perspective view of an assembled foundation with an optional deployable mat.

FIG. 13 shows a partially unfolded platform 116 that can optionally be used with the foundation 10. The platform 116 is made of fabric to cover the foundation area and has a plurality of longitudinal pockets 118 into which cardboard panels can be inserted. These panels in the pockets provide stiffness for the flat platform over the spanned slats. In a preferred embodiment, the cardboard and its receiving pockets are ten inches wide, so that six pockets and panels can be used for a queen size foundation; four can be used for a twin size.

Certain modifications and improvements will occur to those skilled in the art upon a reading of the foregoing description. All such modifications and improvements have not been included herein but may properly fall within the scope of the appended claims.

The invention may also be characterized thusly:

A. A method of selling beds comprising
selling a collapsed mattress that can be carried by an adult customer by him or herself,
selling a disassembled foundation having longitudinal parts and cross members to retain the longitudinal parts in an assembly in its disassembled state that can be carried by an adult customer by him or herself,
permitting a customer to carry the collapsed mattress and disassembled foundation to a car for transport to a residence for assembly of the foundation and uncollapsing of the mattress.

B. A method of assembling a bed foundation comprising
placing each of a pair of opposing ends of an interior beam into an opening in one of a pair of a transverse end members,
connecting a pair of exterior side beams to the transverse end members, and
placing a plurality of slats into each of a pair of slat tracks so the slats span from the exterior side beams to the interior beam.

C. The method according to Paragraph B further comprising placing a slipcover on the foundation.

D. The method according to Paragraph B further comprising uncollapsing a mattress and placing the uncollapse mattress on the foundation.

E. The method of Paragraph B, wherein connecting includes interleaving connector loops that are attached to the exterior side beams and the transverse end members and inserting a pin into the interleaved loops to retain them together.

F. A ready-to-assemble bed foundation comprising:
a pair of exterior side beams having two ends with connectors at each end that include parallel, spaced-apart tongues rigidly supported on a base plate,
a pair of transverse end members each having two ends with connectors at each end that include parallel spaced-apart tongues rigidly supported on a base plate and each having a medial opening between its ends,
pins for insertion through interleaved ones of the connectors attached to one end of one side beam and one end of a transverse member, and
an interior beam including end portions configured to extend into the medial openings in the transverse end members,
whereby the side beams and end members can be assembled into a quadrilateral shape with the interior beam extending between the transverse ends and the pins can be inserted in interleaved ones of the connectors at corners of the quadrilateral shape to maintain the shape with the interior beam held in position between the transverse ends.

G. A method of selling beds comprising:
offering a collapsed mattress and disassembled foundation to purchasers through an offering medium selected from the group of consisting of a catalog, an internet website, a telephone solicitation, and a physical store;
accepting an order from a purchaser for the collapsed mattress and disassembled foundation; and
shipping the collapsed mattress and disassembled foundation to the purchaser for assembly of the foundation and uncollasping of the mattress.

I claim:

1. A ready-to-assemble bed foundation kit comprising:
separate multipart preassembled subcomponents that can be assembled into a bed foundation and a container in which the separate multipart preassembled subcomponents are shippable, the separate multipart preassembled subcomponents including:
a pair of multipart transverse end members;
a pair of multipart exterior side supports, each exterior side support configured to extend upon final assembly longitudinally from one of the transverse end members to the other, each exterior side support comprising a pair of longitudinal members coupled in spaced apart vertical relation to form a supporting beam upon final assembly as part of the bed foundation;
an interior multipart support configured to extend upon final assembly from one of the transverse end members to the other between the exterior side supports, the interior multipart support comprising a pair of interior longitudinal members coupled in spaced apart relation to form a beam upon final assembly as part of the bed foundation;
the exterior side supports and transverse end members having connector components, the connector components of the side supports configured to cooperatively connect with connector components of the transverse end members, and
a plurality of spaced apart slats each having a surface defining a portion of the uppermost surface of the bed foundation upon final assembly and each supported by the interior multipart support and at their ends by one of the pair of exterior side supports, whereby to assemble the separate preassembled subcomponents to form the bed foundation, the exterior side supports are affixable upon final assembly to the transverse end members by connecting their cooperating connector components, retaining the interior multipart support between the exterior side supports and joined to the transverse end members, and the slats can be mounted to span the exterior side supports and the interior multipart support.

2. The ready-to-assemble bed foundation kit according to claim 1 further including a slipcover for placement over the foundation upon assembly of the kit.

3. The ready-to-assemble bed foundation according to claim 1 wherein the slats and exterior side supports have aligned holes and further comprising molded plastic fasteners to pass through aligned holes in the slats and the exterior side supports to fasten the slats to the exterior side supports, wherein the fasteners are selected from the group consisting of fasteners having a plurality of flexible flanges surrounding a stem and fasteners having longitudinal ribs.

4. A ready-to-assemble bed foundation as claimed in claim 1 wherein the connector components of the side supports and transverse end members include flanges with openings and the flanges can be interleaved to align the openings in the interleaved flanges, and pins to extend through the aligned openings.

5. The ready-to-assemble bed foundation kit of claim 1 wherein the connectors comprise corner connectors, corners of the exterior side supports being connectable to corners of the transverse end members.

6. The ready-to-assemble bed foundation kit of claim 1 wherein the connectors are detachable from each other to allow disassembly of the bed foundation and subsequent attachment after detachment.

7. The ready-to-assemble kit of claim 1 wherein, both the preassembled multipart exterior side supports and the preassembled multipart exterior side supports are configured for affixation upon final assembly to the preassembled multipart transverse end members before attachment of the slats to span the preassembled exterior side supports and the preassembled interior mulitpart support.

8. A ready-to-assemble bed foundation in kit form comprising in unassembled condition:
a pair of preassembled multipart exterior side beams having two ends with connectors at each end that include parallel, spaced-apart tongues rigidly supported on a base plate,
a pair of preassembled multipart transverse end members each having two ends with connectors at each end that include parallel spaced-apart tongues rigidly supported on a base plate and each having a medial opening between its ends,
pins for insertion through the connectors attached to one end of one side beam and one end of a transverse member, and
a preassembled multipart interior beam including end portions configured to extend into the medial openings in the transverse end members, and
a container for shipping the multipart preassembled subcomponents in kit form, the multipart preassembled subcomponents being positioned within the container to form the kit,
whereby the preassembled side beams and end members are removable from the container for subsequent assembly into a quadrilateral prismatic shape including top, bottom, side and end faces of the bed foundation with the multipart interior beam extending between the transverse end members and the pins can be inserted in interleaved ones of the connectors at corners of the quadrilateral shape to maintain the shape with the multipart interior beam held in position between the transverse end members.

9. A ready to assemble kit including the following preassembled kit subcomponents contained in a container, the preassembled kit subcomponents being interconnectable on site, and after shipment in the container, to form a bed foundation for use with a mattress:
first and second preassembled side beams, each side beam comprising upper and lower longitudinal members coupled in spaced apart vertical relation by a plurality of spaced apart blocks extending between the upper and lower longitudinal members;
a preassembled interior beam, the preassembled interior beam comprising upper and lower interior longitudinal members coupled in spaced apart vertical relation by a plurality of spaced apart blocks extending between the upper and lower interior longitudinal members;
first and second preassembled transverse end beams, each end beam comprising upper and lower transverse members coupled in spaced apart vertical relation by a plurality of spaced apart blocks extending between the upper and lower transverse members;
connectors for attaching corners of the first and second preassembled transverse end beams to corners of the first and second preassembled side beams to define a periphery of a quadrilateral bed foundation having a bed foundation length and bed foundation width upon final assembly of the preassembled kit subcomponents with the preassembled interior beam extending between the first and second preassembled transverse end beams and parallel within the first and second preassembled side beams;
a plurality of slats attachable between the first and side preassembled side beams upon final assembly; and
the container in which the preassembled kit subcomponents of the kit are packaged therein in a configuration prior to final assembly, the container having a length sufficient to receive the first and second preassembled side beams and the a preassembled interior beam, and a width less than the bed foundation width so that the kit can be shipped in a volume less than a bed foundation volume.

10. The ready to assemble kit of claim 9 wherein the container comprises a carton.

11. The ready to assemble kit of claim 9 wherein the first and second preassembled side beams and the first and second preassembled transverse end beams each have corner blocks at opposite ends thereof.

12. The ready to assemble kit of claim 11 wherein connector components are matable to form the connectors attached to each of the corner blocks.

13. The ready to assemble kit of claim 11 wherein the preassembled interior beam includes end portions extending, at each end, beyond the upper and lower interior longitudinal members.

14. The ready to assemble kit of claim 9 further comprising a slipcover folded on top of the other preassembled subcomponents.

15. The ready to assemble kit of claim 9 including a plurality of fasteners for attaching the slats to the first and second preassembled side beams upon final assembly.

16. The ready to assemble kit of claim 9 wherein the first and second preassembled side beams, the preassembled interior beam, and the first and second preassembled transverse end beams, all comprise multipart subcomponents as packaged in the container.

17. The ready to assemble kit of claim 9 wherein, each connector includes parallel spaced-apart tongues rigidly supported on base plates and a transverse end member having a medial opening between its ends.

18. The ready to assemble kit of claim 9 configured upon final assembly as a bed foundation for use with a collapsible mattress for shipment.

19. The ready to assemble kit of claim 9 wherein the preassembled interior beam includes end members at each end insertable within openings along the first and second preassembled transverse end beams for final assembly of the bed foundation.

* * * * *